Nov. 11, 1924.

U. G. B. UPDEGROVE

TIRE HEATER

Filed Sept. 25, 1922    2 Sheets—Sheet 1

1,515,421

U.G.B. Updegrove
INVENTOR

BY Victor J. Evans
ATTORNEY

WITNESS:

Nov. 11, 1924.

U. G. B. UPDEGROVE

TIRE HEATER

Filed Sept. 25, 1922

U.G.B. Updegrove
INVENTOR

Patented Nov. 11, 1924.

1,515,421

UNITED STATES PATENT OFFICE.

ULYSSES G. B. UPDEGROVE, OF CIMARRON, KANSAS.

TIRE HEATER.

Application filed September 25, 1922. Serial No. 590,525.

*To all whom it may concern:*

Be it known that I, ULYSSES G. B. UPDEGROVE, a citizen of the United States, residing at Cimarron, in the county of Gray and State of Kansas, have invented new and useful Improvements in Tire Heaters, of which the following is a specification.

This invention relates to improvements in tire heaters and has for its principal object a device of this character which will expand or contract tires or bands so that they may be placed on a wheel of a vehicle.

Another object of the invention is to produce a tire heater having a line of piping connected to the bottom of a fuel supply tank and bent at right angles thereto and adjustable means provided on said pipe for directing the flame upon the tire or nest of tires.

A further object of the invention is to produce a tire heater having a fuel supply tank arranged to one side thereof and a line of piping connecting the fuel supply tank with adjustably spaced L-shaped pipes which have torch burners provided thereon for heating the tires or bands, so that the same may be placed on a wheel of a motor vehicle and means for directing the fuel and heat from the torch burners into the atmosphere.

This invention also consists in certain other features of construction and in the combination and arrangement of the several parts, to be hereinafter fully described, illustrated in the accompanying drawings and specifically pointed out in the appended claim.

In describing my invention in detail reference will be had to the accompanying drawings wherein like characters of reference denote like or corresponding parts in the several views, and in which:—

In the drawings:—

Figure 1:
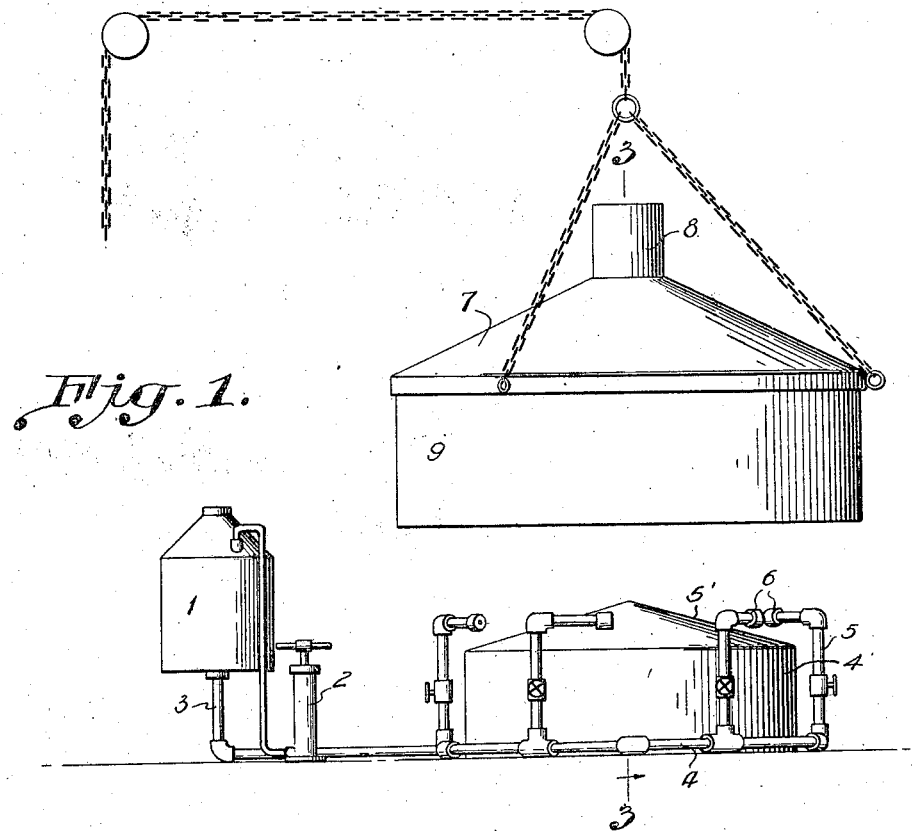
Figure 1 is a side elevation of the invention.
Figure 4:
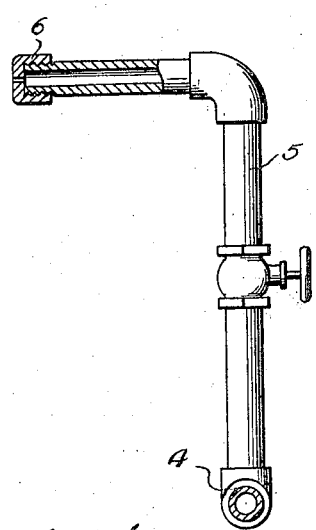
Figure 4 is a vertical sectional view taken on line 4—4 of Figure 2.
Figure 2:
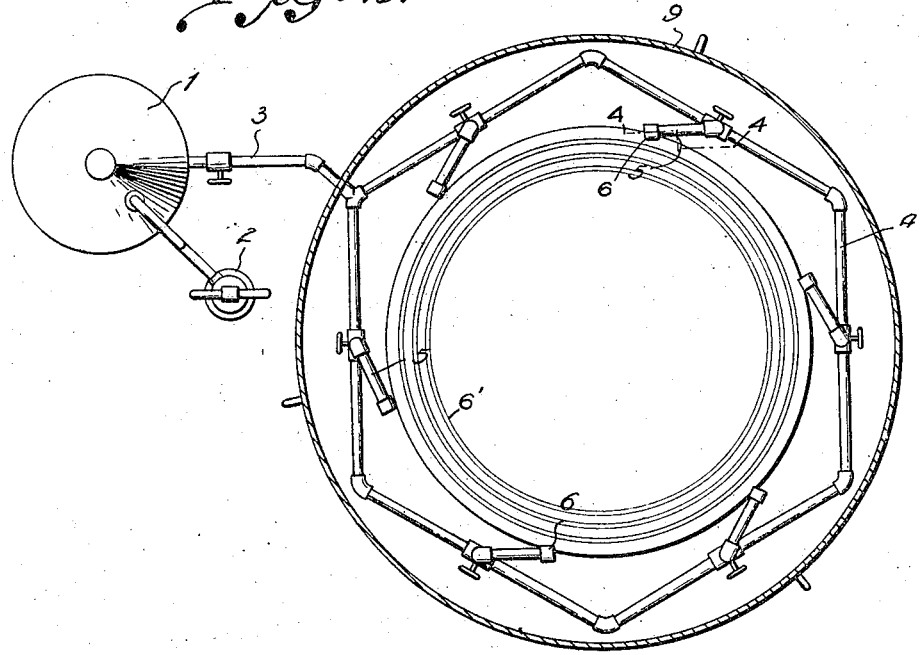
Figure 2 is a top plan view of the invention showing the hood in section.
Figure 3:
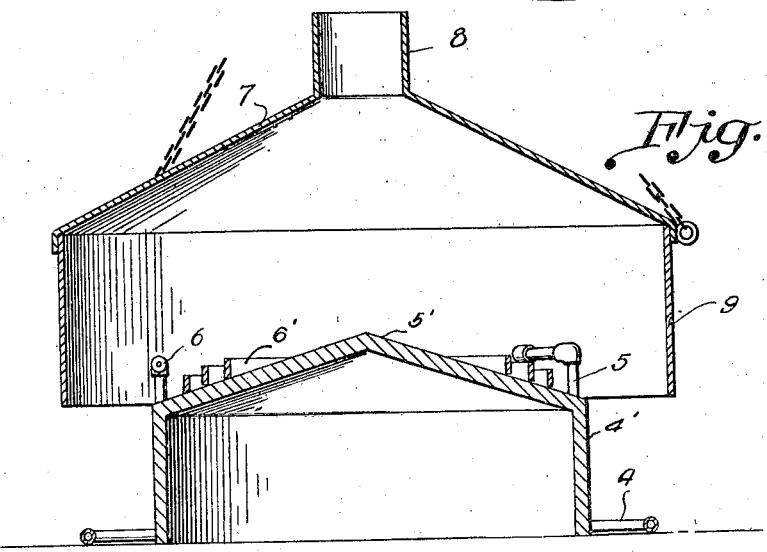
Figure 3 is a longitudinal sectional view taken on line 3—3 of Figure 1.

Referring now to the drawings wherein like characters of reference denote corresponding parts 1 indicates a fuel supply tank having an air pressure pump 2 connected thereto for supplying fuel to a pipe line 3 which has one end connected centrally at the bottom of the tank and the remaining portion formed into a hexagonal frame 4 with the opposite end connected to the pipe line intermediate the ends to provide approximately the same amount of fuel for the burners, which will now be described. Adjustably spaced L-shaped pipes 5 are connected to the hexagonal portions of the pipe line and extend upwardly therefrom, the L-shaped portions of said pipes carry torch burners 6 and the former may be adjusted so as to direct the flame in any direction. Arranged within the hexagonal shaped frame there is a rounded hollow casing 4' having a conical shaped top 5' arranged in the path of the flame from the burner. A tire or nest of tires may be placed over the round hollow casing 4' between the spaced L-shaped members, so that when the fuel is fed through the pipe line 3 to the adjustable L-shaped pipes and torch burners this conical shaped top will have a tendency to deflect the heat toward the outer periphery thereof so that the heat will be intensified around the tires, etc., which will become heated to such a degree that they will expand or contract the tires or bands to permit the latter to be fitted on the wheels of a vehicle.

A hood 7 having a smoke stack 8 provided centrally at the top thereof and a drum 9 designed to bear against the bottom of said hood for directing the smoke and noxious gases to said smoke stack.

While the casing 4' has been described as rounded it is apparent that the same may be of the sectional type and swivelly connected together, so as to accommodate any size tires or bands.

From the above it will be seen that when it is desired to heat the tires or bands the same are placed upon the rounded hollow casing 4' so that when the fuel is fed from the supply tank to the burners which are carried by the L-shaped portions of the adjustable pipes the casing will be heated intensely adjacent its outer portion and the tires or bands will be heated to such a degree that they may be removed and fitted on the wheels of a vehicle as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tire heater of the character described comprising a rounded casing, a conical shaped top formed on said casing, burners arranged adjacent said casing in a manner whereby said conical shaped top is in the path of the flame of the burner for the purpose specified.

In testimony whereof I affix my signature.

ULYSSES G. B. UPDEGROVE.